US005391867A

United States Patent [19]

Grumberg

[11] Patent Number: 5,391,867

[45] Date of Patent: Feb. 21, 1995

[54] WIDE FORMAT SCANNER HAVING A LINEAR SCANNING ELEMENT WITH A SELECTABLE ORIENTATION

[76] Inventor: Manfred Grumberg, 64 Dania Street, Haifa 34980, Israel

[21] Appl. No.: 21,597

[22] Filed: Feb. 24, 1993

[51] Int. Cl.[6] .......... H04N 1/14

[52] U.S. Cl. .......... 250/208.1; 250/235; 358/496; 348/195

[58] Field of Search .......... 250/208.1, 559, 560, 250/563, 571, 572, 234, 235, 584, 586, 589; 358/498, 496, 494, 483, 482, 476, 474, 199; 355/235; 346/139 A; 318/135

[56] References Cited

U.S. PATENT DOCUMENTS

| | | | |
|---|---|---|---|
| 2,044,831 | 6/1936 | Chereau et al. . | |
| 2,951,118 | 8/1960 | Shahbender | 358/494 |
| 3,069,494 | 12/1962 | Fischer | 358/498 X |
| 3,314,075 | 4/1967 | Becker et al. . | |
| 3,652,793 | 3/1972 | Farr et al. | 358/498 X |
| 4,525,828 | 6/1985 | Higashiyama et al. | 369/111 |
| 4,687,352 | 8/1987 | Igi et al. | 250/235 X |
| 4,692,812 | 9/1987 | Hirahara et al. | 358/285 |
| 4,706,129 | 11/1987 | Yamada | 358/494 |
| 4,920,421 | 4/1990 | Stemmle | 358/498 X |
| 4,933,779 | 6/1990 | Milch | 358/489 |
| 4,963,997 | 10/1990 | Van Scooter | 358/493 |
| 5,153,738 | 10/1992 | Stemmle | 358/498 X |

*Primary Examiner*—David C. Nelms
*Assistant Examiner*—John R. Lee
*Attorney, Agent, or Firm*—Howard L. Rose

[57] ABSTRACT

A wide format scanner moves a substrate to be scanned along a first axis and at a first predetermined speed, and moves a scanning head across the substrate obliquely with respect to the first axis at an angle and at a speed coordinated with the first predetermined speed so as to provide a scan trace perpendicular to the first axis.

13 Claims, 7 Drawing Sheets

WIDE FORMAT SCANNER HAVING A LINEAR SCANNING ELEMENT WITH A SELECTABLE ORIENTATION

FIELD OF THE INVENTION

The present invention relates generally to electro-optical scanners.

BACKGROUND OF THE INVENTION

Various types of scanners are known in the marketplace and in the patent literature. Most of them employ a scan trace which extends perpendicularly to the direction of displacement of the scanned substrate and thus operates in a stepped motion.

There exist two basic techniques for scanning large formats. One technique, using multiple CCD arrays, is described in "A High-Resolution, High-Speed Film Scanner System Using Optically Butted Charge-Coupled Devices (CCDs)" by Richard A. Whittlesey, SPIE, Vol. 149, Applications of Digital Image Processing (1978), pages 156–165. Another technique, employing a single CCD array which is displaced through multiple sweeps along an X-Y plane, is described in U.S. Pat. No. 4,692,812.

U.S. Pat. No. 4,525,828 to Higashiyama et al describes an optical recording device, including a magnetic recording tape, a pair of magnets and a rotary drum. The tape is driven obliquely on the outer circumference of the drum causing a laser beam to create a retrace line on the tape which is inclined with respect to the longitudinal direction of the tape.

U.S. Pat. 2,044,831 to Chereau et al describes a message scanning or reconstituting system including a curved surface or message carrier involving relative displacement of the scanning system and of the message carrier. The message carrier is caused to undergo translation movement along a given axis by moving the message oblique along the carrier, i.e. by displacing the message along a helix traced on a cylindrical surface.

U.S. Pat. No. 3,314,075 to Becker et al describes a light recording system utilizing a laser, a beam guiding assembly and a recording head and film drive for producing a series of closely spaced helically spaced traces across a film.

SUMMARY OF THE INVENTION

The present invention seeks to provide a scanner which can be operative in a continuous rather than a stepped mode of operation.

There is thus provided in accordance with a preferred embodiment of the present invention a scanner comprising apparatus for displacing a substrate to be scanned along a first axis and at a first speed, a scanning head operative to scan the substrate, and apparatus for moving the scanning head across the substrate obliquely with respect to the first axis at an angle and at a speed coordinated with the first speed so as to provide a scan trace across the substrate which is perpendicular to the first axis.

For the purposes of the present application, the terms "scanner", "scan" and "scanning" are intended to be used in a broad sense and may apply equally to writing, reading or both.

Further in accordance with a preferred embodiment of the present invention, there is provided a single motor which simultaneously operates both the apparatus for displacing and the apparatus for moving for providing coordinated operation thereof.

Additionally in accordance with an embodiment of the invention the scanning head comprises a linear scanning element and apparatus for selectably orienting the linear scanning element with respect to the first axis, thereby determining the scan resolution.

In a reading mode, the linear scanning element may comprise, for example, a linear CCD array. In the writing mode, the linear scanning element may comprise, for example, a laser writing head.

Further in accordance with a preferred embodiment of the present invention, the scanning head is rotatably mounted on an endless belt which provides reciprocal motion thereof.

It is a particular feature of the present invention that generally continuous driving motion of the substrate and of the scanning head are produced in respective non-perpendicular directions, producing a perpendicular scan of the substrate.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
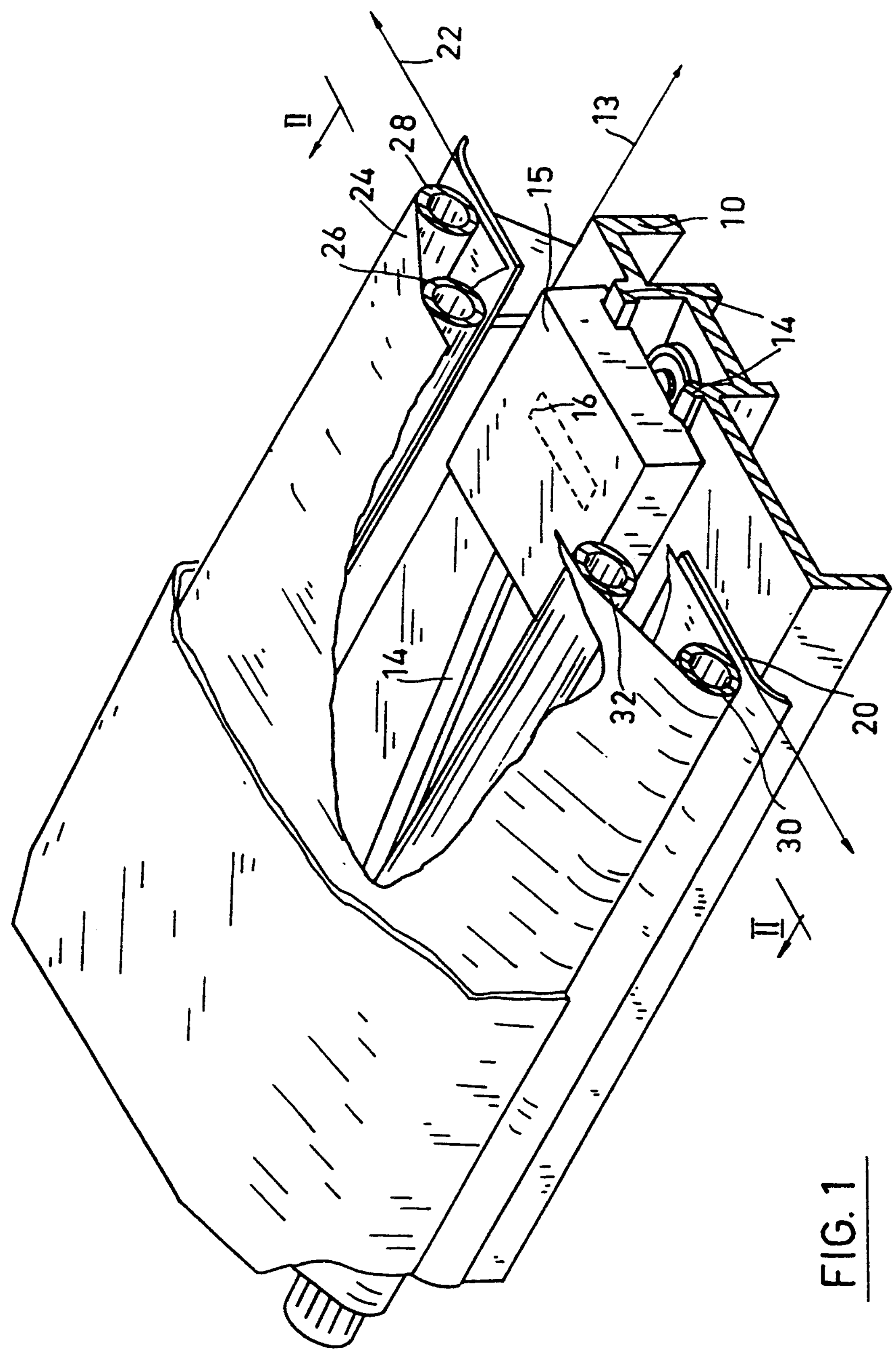
FIG. 1 is a partially cutaway pictorial illustration of a scanner constructed and operative in accordance with a preferred embodiment of the present invention.
Figure 2:
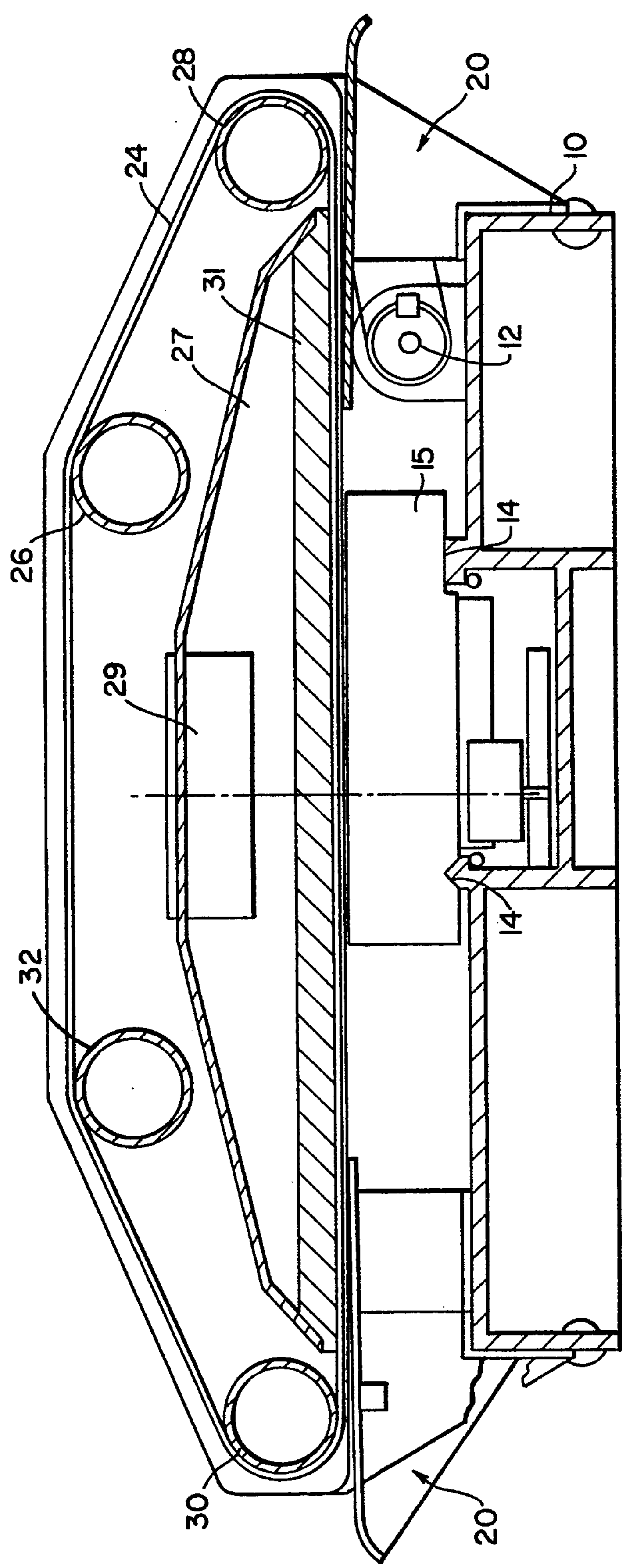
FIG. 2 is a side view sectional illustration taken along lines II—II of FIG. 1.
Figure 3:
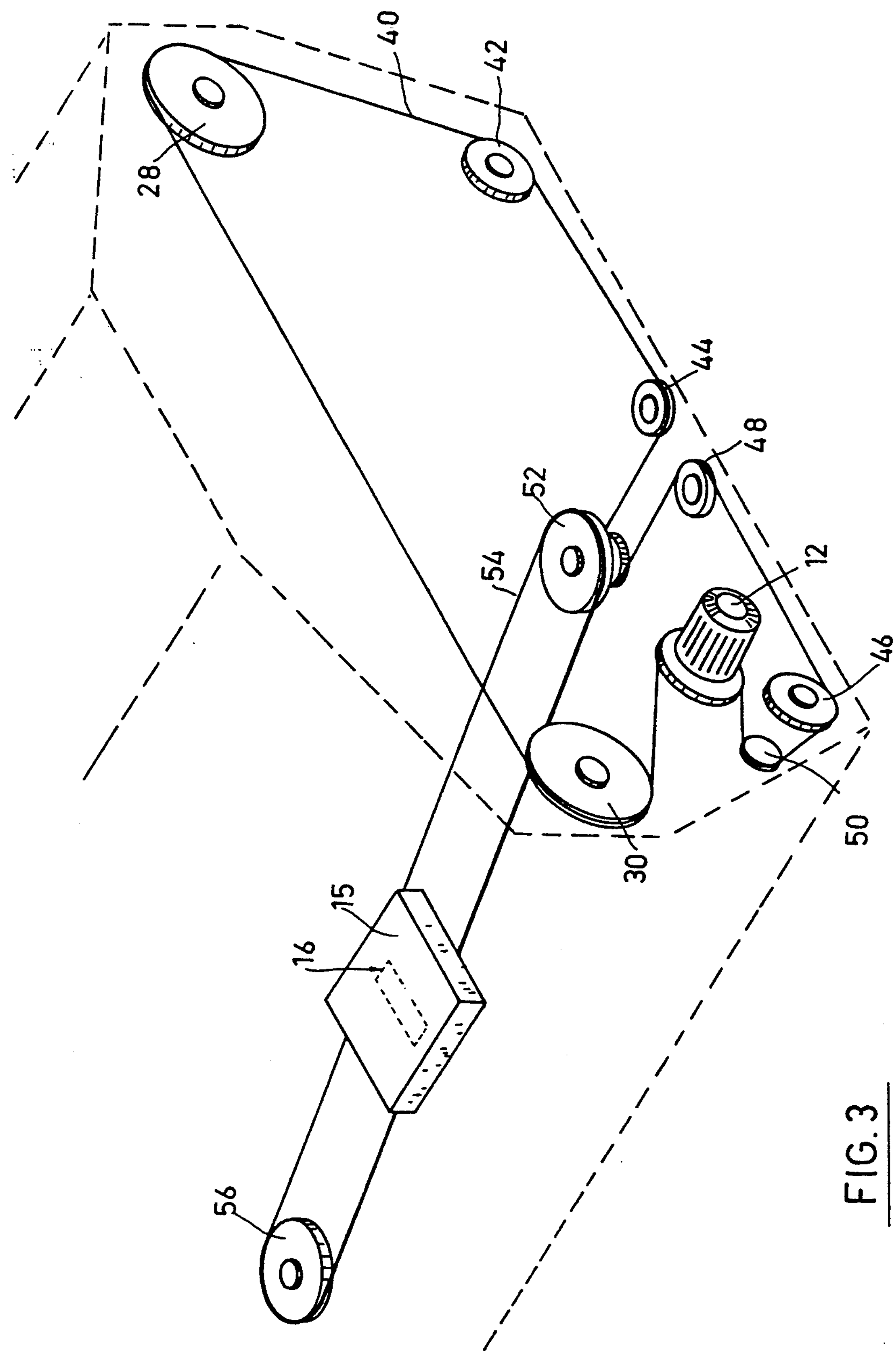
FIG. 3 is a diagrammatic illustration of a driving mechanism used in the scanner in accordance with a preferred embodiment of the present invention.
Figure 4:
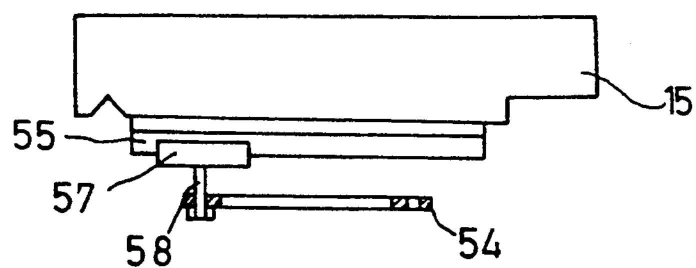
FIG. 4 is a simplified sectional illustration illustrating the mounting of the scanner head on the driving mechanism of FIG. 3.

Reference is now made to FIGS. 1–3, which illustrate a scanner constructed and operative in accordance with a preferred embodiment of the present invention.

The scanner comprises a base 10, onto which is disposed a motor 12. Preferably the base 10 comprises a precision formed element extending along a longitudinal axis 13. The base defines an elongated track 14, preferably in the form of a sliding track or linear bearing, which extends obliquely with respect to the longitudinal axis 13. A scanning head 15, typically comprising a linear scanning element 16, is arranged for reciprocal motion along track 14.

The scanning head 15 may operate for either or both of read and write scanning. Where the scanning head operates as a reading head, the linear scanning element 16 may comprise, for example, a CCD array, which may be unitary or comprise a plurality of discrete elements. Where the scanning head operates as a writing head, the linear scanning element 16 may comprise,for example, a laser printer head, such as a Caron laser printer head. Such a laser printer head is described in "Laser Scanning for Electronic Printing" by John C. Urbach et al, Proceedings of the IEEE, Vol. 70, No. 6, June 1982, pages 597–618, the disclosure of which is incorporated herein by reference.

The laser scanning element 16 of the scanning head 15 is arranged to lie in a plane which is generally coplanar with a scanned substrate support assembly 20. A substrate to be scanned (not shown) is driven in precise linear motion along an axis 22, normally perpendicular to axis 13, and arranged such that elongated track 14 lies oblique with respect thereto.

The substrate to be scanned is preferably driven by an endless belt 24 which is mounted on rollers 26, 28, 30 and 32 and driven by motor 12. Typically belt 24 is formed with a multiplicity of apertures, so as to be generally porous, whereby suction may be applied thereto to the substrate, for low slip engagement between the substrate and the belt 24.

Suction is generated, according to a preferred embodiment of the invention, in a suction chamber 27 by means of an exhaust fan 29 and applied through an apertured platen 31 and belt 24 to the substrate.

According to an alternative embodiment of the invention, support engagement of the substrate with the belt 24 may be provided electrostatically or by any other suitable means.

It is a particular feature of the present invention that generally continuous driving motion of the substrate and of the scanning head are produced in respective non-perpendicular directions, producing a perpendicular scan of the substrate.

This is achieved in accordance with a preferred embodiment of the present invention through the use of a driving arrangement, which is illustrated most particularly in FIG. 3. It is seen that a first driving chain 40, such as a Min-E-Pitch 3-D Belt, commercially available from Winfred M. Berg, Inc. of East Rockaway, N.Y. 11518, U.S.A., interconnects electric motor 12 with rollers 28 and 30 for driving of the substrate, and via idling sprockets 42, 44, 46, 48 and 50 drives a capstan 52, onto which is mounted a second driving chain 54, which is also supported on a roller 56.

Second driving chain 54 typically comprises a Min-E-Pitch Cable Chain, commercial available from Winfred M. Berg, Inc. of East Rockaway, N.Y. 11518, U.S.A., and is coupled to the scanning head 15 for driving thereof in reciprocal motion along oblique track 14.

An encoder (not shown) may be associated with motor 12 to provide line start indications to the linear scanning element 16.

Reference is now made to FIGS. 4 and 5A–5C, which illustrate the connection between the scanning head 15 and driving chain 54. Formed on the underside of scanning head 15 is a linear rail 55 onto which is slidably mounted a carriage 57 from which pivotably depends a pin 58 which engages driving chain 54.

Figure 5A:
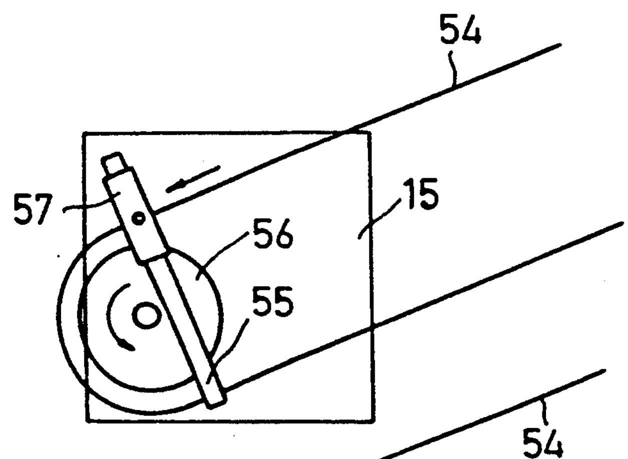
FIGS. 5A, 5B and 5C are cutaway illustrations showing three different orientations of the mounting of the scanning head and the end of a scan line.
Figure 5B:
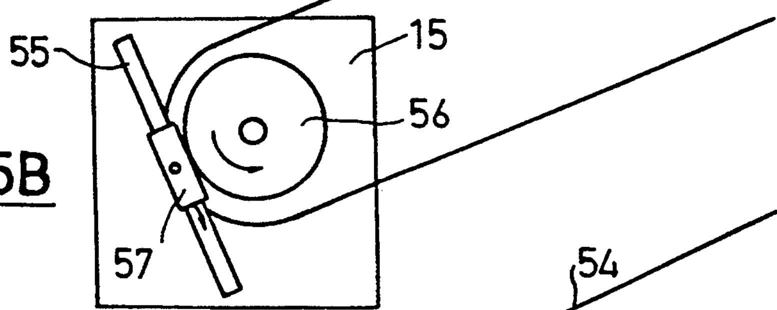
Figure 5C:
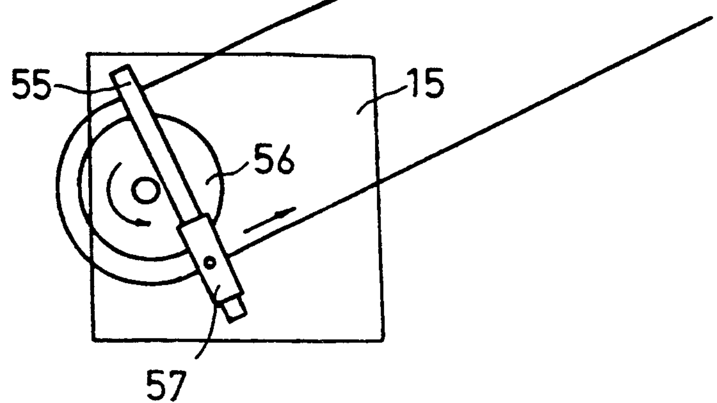

As seen in FIGS. 5A–5C, as the scanning head 15 reaches the end of a line, the carriage 57 moves from a position adjacent one end of the rail 55, through a center position as the pin 58 changes direction and to a position adjacent the other end of the rail 55, as the pin begins to move in the opposite direction. The mechanism illustrated in FIGS. 4 and 5A–5C may thus be understood to constitute a lost motion mechanism with respect to motion of the scanning head 15 transverse to track 14.

According to an alternative embodiment of the invention, driving of the scanning head 15 may be provided using a reversing actuator such as a Norco Ball Reverser, manufactured by Flennor, Inc. of Georgetown, Conn. 06829, U.S.A.

It is a particular feature of the present invention that the motions of the scanner head and of the substrate drive are produced by a single motor and are thus coordinated.

Reference is now made to FIGS. 6A–6E, which illustrate various stages in multi-line scanning produced by the apparatus of the present invention. It is noted that the number of lines simultaneously scanned may be any suitable number, typically between 500–5000 pixels.

Figure 6A:
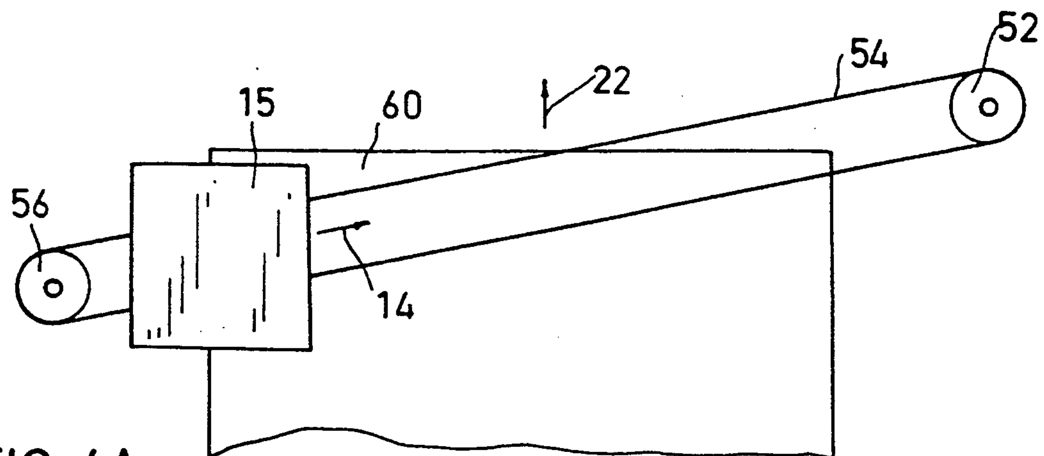
FIGS. 6A, 6B, 6C, 6D and 6E illustrate various stages in scanning of a document in accordance with a preferred embodiment of the present invention.
Figure 6B:
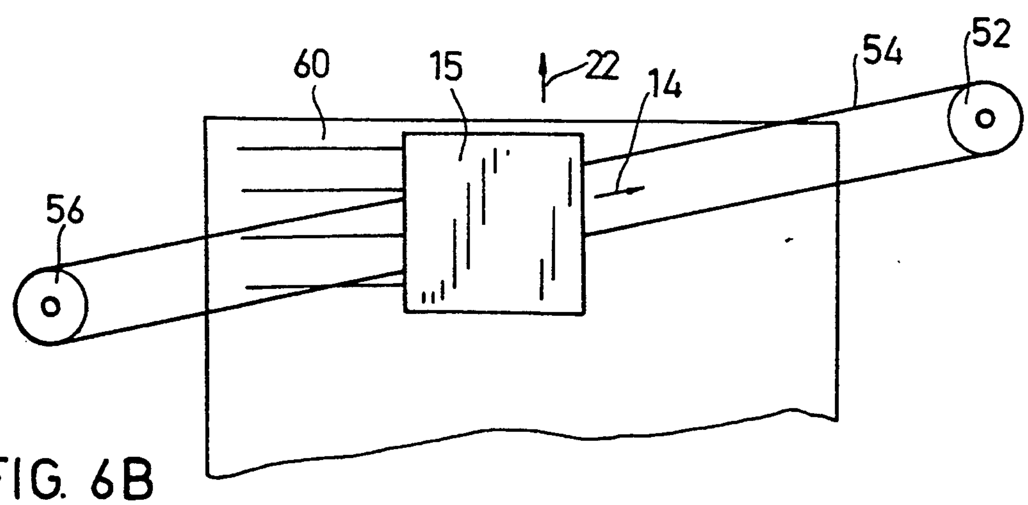

FIG. 6A shows the beginning of a scan, with a substrate to be scanned 60 moving along axis 22, while scanning head 15 moves along track 14, in a direction indicated by an arrow identified by reference numeral 14, obliquely to axis 22. As the substrate 60 progresses along axis 22, the scanning head 15 progresses along track 14, the speeds of progress of the substrate along axis 22 and of the scanning head along track 14, being in a ratio so as to produce a scan of substrate 60 perpendicular to axis 22, as seen in FIG. 6B.

Figure 6C:
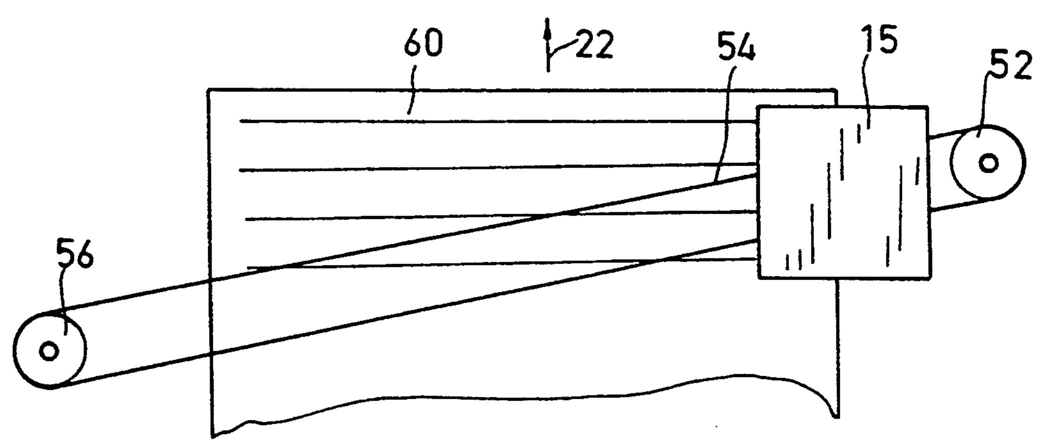

FIG. 6C illustrates the end of a scan line. At this stage also, the substrate 60 continues to move along axis 22 and drive chain 54 continues to move along track 14. The motion of the scanning head 22 is, however, reversed, by means of the mounting arrangement described hereinabove.

Figure 6D:
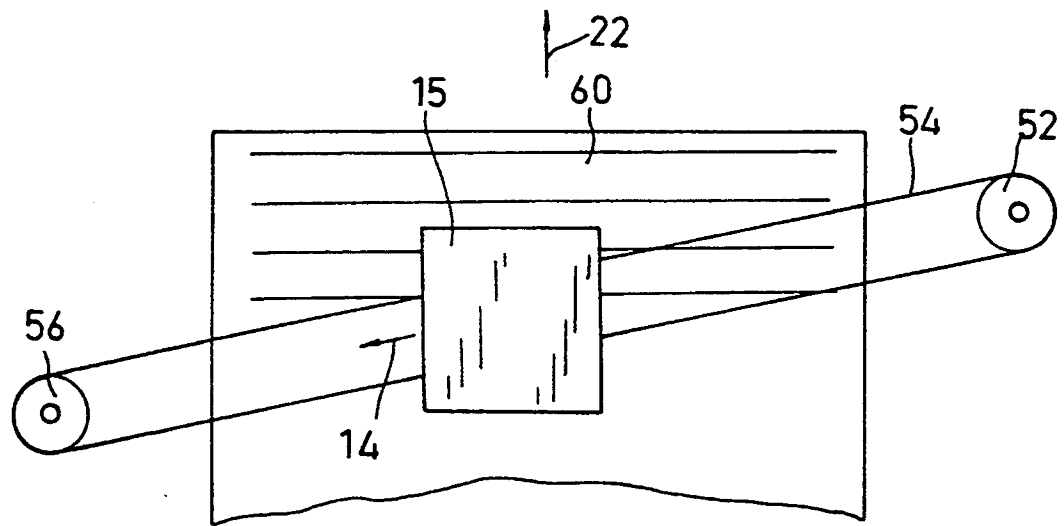
Figure 6E:
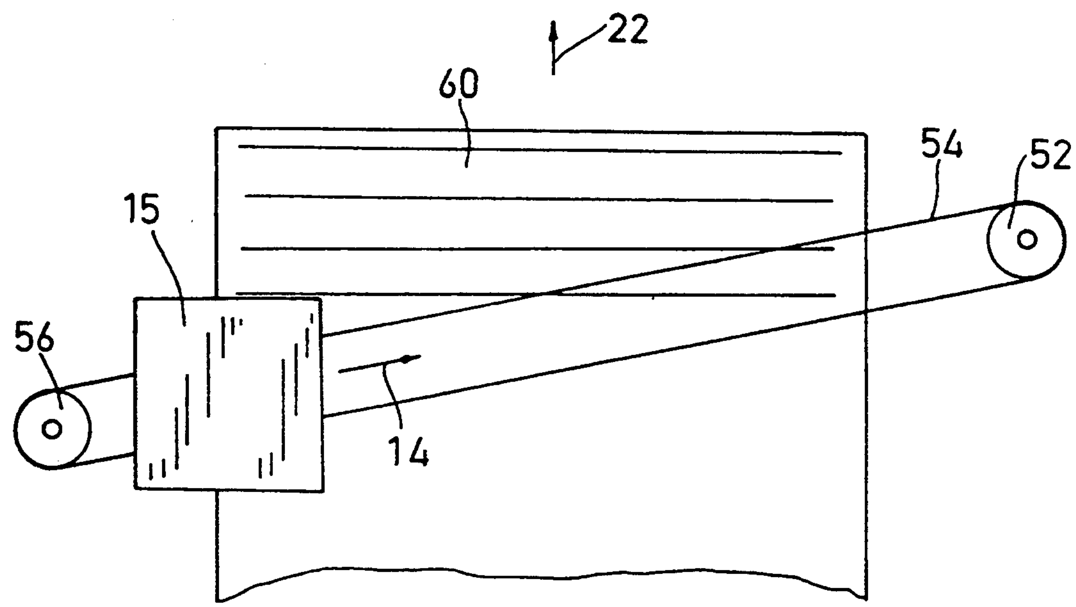

FIG. 6D illustrates the retrace motion of the scanning head back along track 14. During this retrace, the scanning head is not operative for scanning. FIG. 6E illustrates the scanning head following the retrace, about to begin another scanning trace. It is a particular feature of the invention, that during the retrace motion, the substrate continues to move forward exactly the amount required for the subsequent trace to follow upon the earlier trace, substantially without leaving areas of the substrate unscanned and without producing overlapping scanning. According to an alternative embodiment of the invention, a predetermined amount of overlap is provided and taken into account in the scanning control.

It is noted that the movement of the substrate throughout the scan and the retrace may be continuous and at a uniform speed. Alternatively, the speed of the substrate and of the scanning head during retrace may be increased, as desired.

Figure 7:
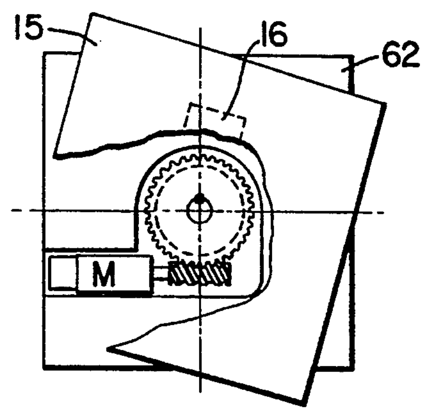
FIG. 7 is a partially cutaway illustration of a selectably orientable scanning head useful in accordance with a preferred embodiment of the invention.
Figure 8A:
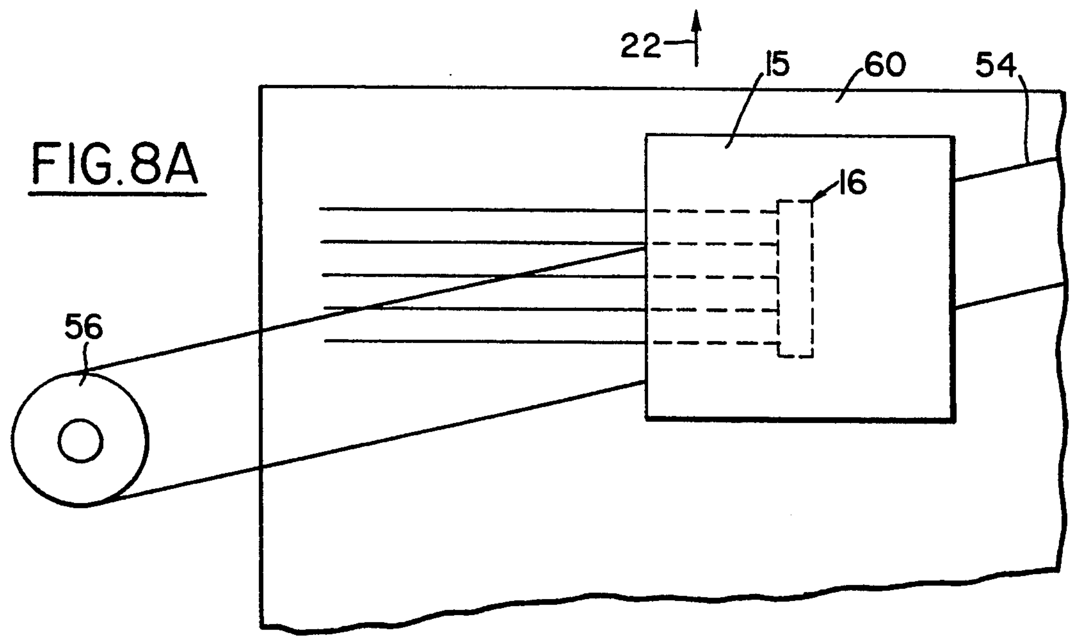
FIGS. 8A and 8B illustrate two alternative orientations of the selectably orientable scanning head of FIG. 7 and the scanning operation produced thereby.
Figure 8B:
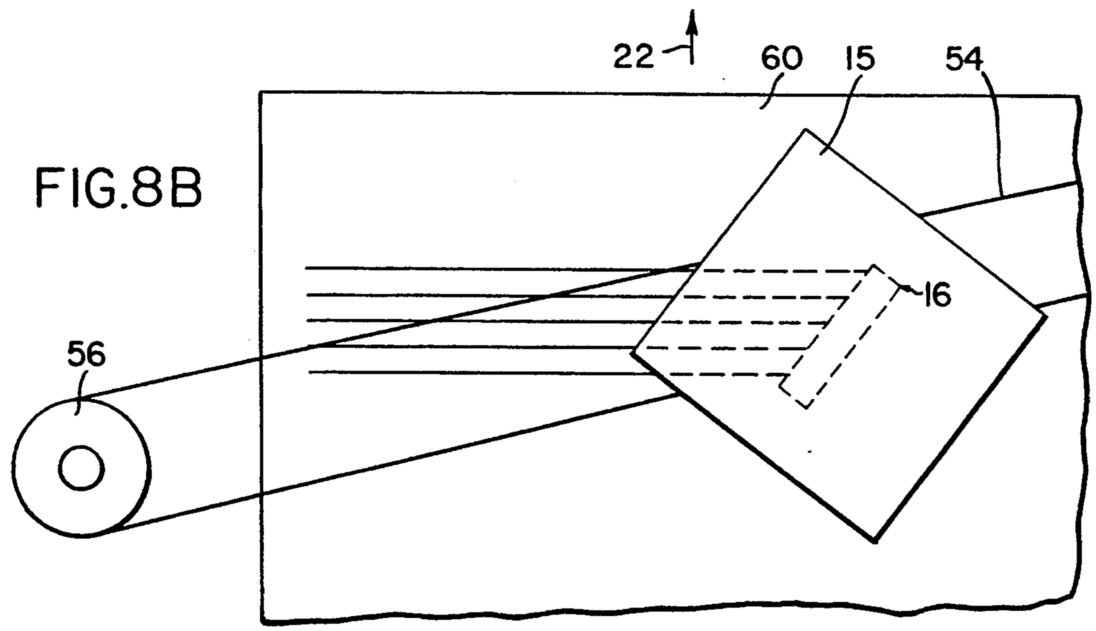

Reference is now made to, FIGS. 7, 8A and 8B, which illustrate a scanner head arrangement which can provide selectable resolution scanning. As noted above, mounted on the scanner head 15 is a linear scanning element 16. When the linear scanning element 16 is arranged perpendicular to the effective scanning direction, i.e. parallel to axis 22, the scanning element 16 covers the widest possible swath. When, however, the scanning head 15 and linear scanning element 16 are rotated such that array 16 does not lie parallel to axis 22, the width of the swath is decreased, producing higher resolution scanning. It is appreciated that when the overall swath covered by the linear scanning element 16 during one scan is narrower, the speed at which the substrate advances along axis 22 must be decreased accordingly.

If the relationship between the speed of substrate advance along axis 22 end the speed at which the scanning element 16 moves along track 14 is fixed, suitable compensation for different swath widths can be made by ignoring scan information for pixels located beyond a given uniform swath.

FIG. 7 illustrates a mechanism for selectably rotating the scanning head 15 and array 16 with respect to a scanning head support 62 which rides along track 14. FIG. 8A illustrates a normal, non-rotated, scanning head arrangement, while FIG. 8B illustrates a rotated scanning head arrangement, wherein the total scanned swath is narrower.

It will be appreciated by persons skilled in the art that the present invention is not limited by what has been particularly shown and described hereinabove. Rather the scope of the invention is defined only by the claims.

What is claimed is:

1. A scanner comprising:

means for displacing a substrate to be scanned along a first axis and at a first speed;

a scanning head having a linear scanning element operative to scan the substrate;

means for moving said scanning head across the substrate obliquely with respect to the first axis at an angle and at a speed coordinated with the first speed so as to provide a scan trace across the substrate which is perpendicular to the first axis; and means for selectably orienting the linear scanning element relative to the first axis, thereby determining the scan resolution.

2. A scanner according to claim 1 also comprising a single motor for simultaneously operating both the means for displacing and the means for moving, thereby providing coordinated operation of said displacing means and of said moving means.

3. A scanner according to claim 2 wherein the operation of the means for displacing and the means for moving is coordinated to provide a complete scan of said substrate.

4. A scanner according to claim 1 wherein the operation of the means for displacing and the means for moving is coordinated to provide a complete scan of said substrate.

5. A scanner according to claim 2 further comprising an endless drive element, the scanning head being rotatably mounted on the endless drive element, and means providing reciprocal motion of the scanning head.

6. A scanner according to claim 1 further comprising an endless drive element, the scanning head being rotatably mounted on the endless drive element, and means providing reciprocal motion of the scanning head.

7. A scanner according to claim 2 wherein said means for displacing comprises vacuum engagement means.

8. A scanner according to claim 1 wherein said linear scanning element comprises a reading scanner element.

9. A scanner according to claim 8 wherein said linear scanning element comprises a CCD scanning array.

10. A scanner according to claim 1 wherein said linear scanning element comprises a CCD scanning array.

11. A scanner according to claim 1 wherein said linear scanning element comprises a writing scanner.

12. A scanner according to claim 1 wherein said linear scanning element comprises a laser writing head.

13. A scanner according to claim 10 wherein said linear scanning element comprises a laser writing head.

* * * * *